Patented May 12, 1925.

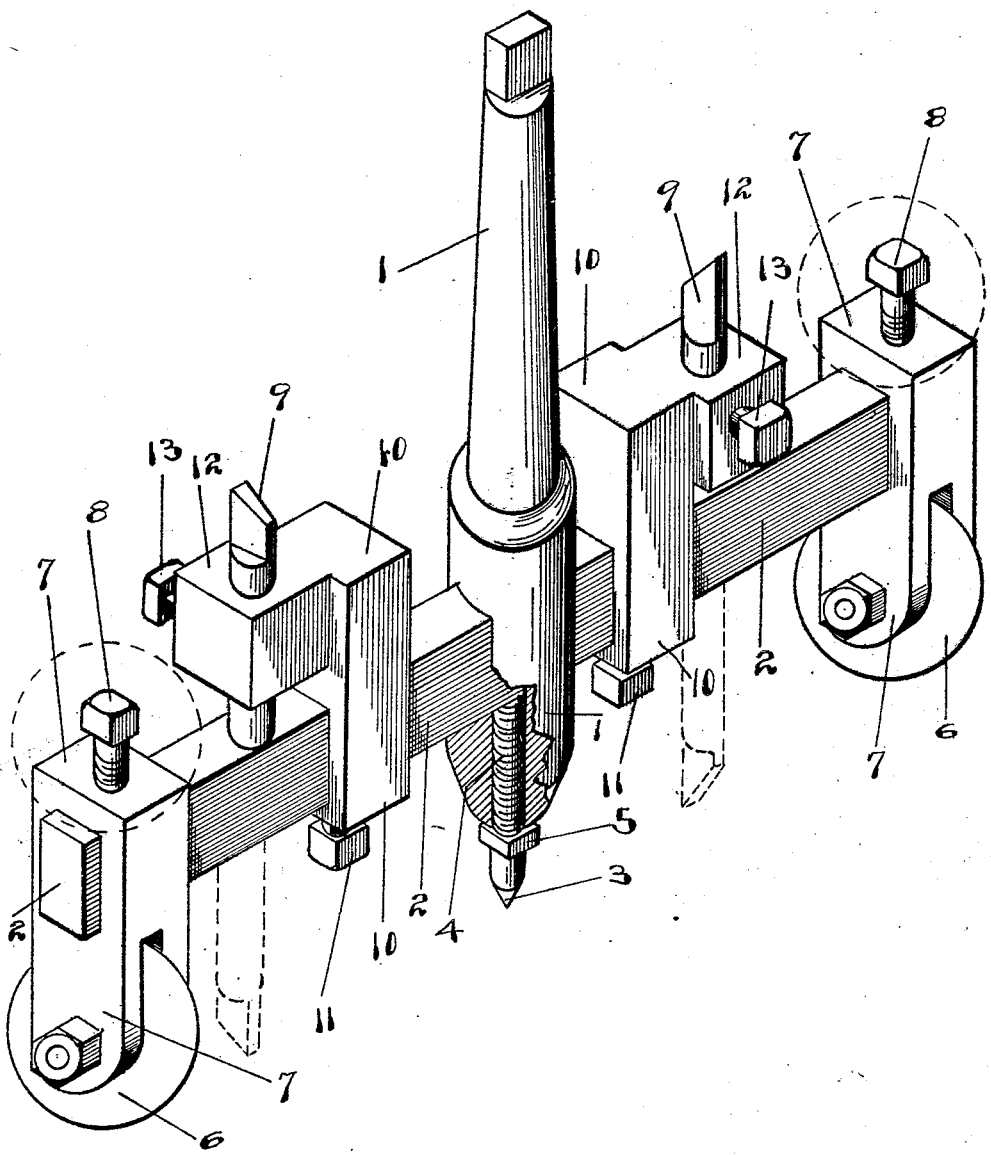

1,537,376

UNITED STATES PATENT OFFICE.

GEORGE PROSSER, OF PORTLAND, OREGON.

CUTTER.

Application filed September 24, 1924. Serial No. 739,487.

*To all whom it may concern:*

Be it known that I, GEORGE PROSSER, a citizen of the United States, residing at Portland, county of Multnomah, State of Oregon, have invented certain new and useful Improvements in Cutters, of which the following is a specification.

My invention relates to cutters in general, and particularly to cutters adapted for cutting disks and washers from sheet material, the object being to provide a simple, cheap and effective implement for such purposes. I accomplish this object by means of the construction illustrated in the accompanying drawing, which is a part of this application for Letters Patent, and which is a perspective view of my device.

In general my device consists of a spindle adapted for insertion into a lathe or drill press chuck or similar holding device, a bar transversely mounted upon said spindle, brackets upon said bar, and cutters mounted within said brackets, the brackets being adapted for various types of cutting tools as hereinafter described.

The spindle 1 is adapted to be inserted within a chuck such as used upon lathes or drill presses, or any like clamping device, and the bar 2 is transversely mounted upon said spindle through a slot therein. To hold the spindle central with the material being cut I provide a pivotal point 3 to enter the material, and the shank of said point is threaded into the spindle as shown at 4. A squared head 5 is provided upon said point whereby to screw the same into the spindle, and the shank 4 is constructed long enough to contact with the bar 2 and thus hold the latter in position.

For cutting soft material such as paper board, fibre, leather, or the like, I provide circular disk cutters 6 rotatably mounted within the forked ends of brackets 7, said brackets being slidably mounted upon the bar 2, and secured thereupon by set screws 8.

For cutting hard material such as metals I provide suitable cutters 9 mounted in brackets 10, which brackets 10 are slidably mounted upon the bar 2, and secured thereupon by set screws 11. The brackets 10 are provided with an extension 12 parallel to the bar 2 and spaced a small distance therefrom, which extension is drilled to receive the tool 9 and allow said tool to project therefrom sufficiently to contact with the bar 2. The tool 9 is secured in place in said extension by the set screw 13. The extensions 12 are offset upon the brackets 10 so that the cutting edges of the tools 9 may lie slightly behind the longitudinal axis of the bar 2 when the tools 9 are operating, and thus remove all tendency of the tools to chatter.

In the drawing the device is shown with the cutters 6 in operating position, and the tools 9 in inoperative position. To place the tools 9 in operative position the brackets 7 and 10 are each reversed upon the bar 2, placing the cutters 6 above the bar in the positions shown in dotted lines, and the tools 9 below the bar in positions shown by dotted lines. By this arrangement it is possible to keep the brackets all upon the bar and thus they are not likely to be lost or misplaced.

By providing the extensions 12 upon the brackets 10 parallel to the bar 2 and allowing the tools 9 to project therethrough to contact with the bar I provide a solid mechanism from the tool to the shank 1 thus avoiding all spring of the parts.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claim.

Having disclosed my invention so that others may be enabled to construct and to use the same, what I claim as new, and desire to secure by Letters Patent is:

In a cutter: a shank; a bar transversely mounted through a slot in said shank; a centering member threaded into the lower end of said shank and securing said bar in place; a bracket upon said bar; an offset extension to said bracket disposed parallel to said bar; and a cutting tool mounted upon said extension and adapted to contact with said bar.

In witness whereof I claim the foregoing as my own I hereunto affix my signature in the presence of two witnesses at Portland, county of Multnomah, State of Oregon, this 5th day of Nov. 1923.

GEORGE PROSSER.

Witnesses:
L. J. ROBINSON,
C. F. BLAKE.